United States Patent [19]

Marker et al.

[11] Patent Number: 5,037,895

[45] Date of Patent: Aug. 6, 1991

[54] PROCESS FOR IMPROVING THERMOPLASTIC HYDROCARBON POLYMERS WITH POLYSULFONAZIDE AND FREE RADICAL CATALYST

[75] Inventors: Ted W. Marker, Deer Park, Tex.; J. S. Gwinn, Bartlesville, Okla.

[73] Assignee: Phillips Petroleum Company, Bartlesville, Okla.

[21] Appl. No.: 228,057

[22] Filed: Aug. 4, 1988

[51] Int. Cl.$^5$ .............................................. C08F 8/34
[52] U.S. Cl. ................................ 525/351; 525/333.8; 525/333.9
[58] Field of Search ................................ 525/351, 387

[56] References Cited

U.S. PATENT DOCUMENTS

| 3,058,944 | 10/1962 | Breslow | 525/351 |
|---|---|---|---|
| 3,144,436 | 8/1964 | Greene et al. | |
| 3,282,864 | 11/1966 | Bost et al. | |
| 3,336,268 | 8/1967 | Cox | |
| 3,957,919 | 5/1976 | Von Bodungen et al. | |
| 4,116,914 | 9/1978 | Coran et al. | |
| 4,460,748 | 7/1984 | Rauer | 525/256 |

*Primary Examiner*—Christopher Henderson
*Attorney, Agent, or Firm*—Laney, Dougherty, Hessin & Beavers

[57] ABSTRACT

A process for improving the properties of a high molecular weight hydrocarbon polymer by reducing the molecular weight thereof and thereby reducing the melt viscosity while retaining the characteristics which provide luster to fibers produced from the polymer is provided. In accordance with the process, the polymer is melted and reacted with both a free radical initiator for lowering the molecular weight and melt viscosity of the polymer by chain scission and a crosslinking agent for crosslinking shortened polymer chains.

18 Claims, No Drawings

PROCESS FOR IMPROVING THERMOPLASTIC HYDROCARBON POLYMERS WITH POLYSULFONAZIDE AND FREE RADICAL CATALYST

BACKGROUND OF THE INVENTION

1. Field of the Invention

The present invention relates to a process for improving the properties of thermoplastic hydrocarbon polymers, and more particularly, to a process for reducing the melt viscosity of high molecular weight hydrocarbon polymers while retaining luster in fibers produced from the polymers.

2. Description of the Prior Art

Processes for improving the melt viscosities and other properties of high molecular weight hydrocarbon polymers by degradation have been developed and utilized heretofore. For example, U.S. Patent No. 3,144,436 issued Aug. 11, 1964, describes a process for improving the processibility of high molecular weight stereoregular hydrocarbon polymers whereby the polymers are reacted with a free radical initiator. The reaction of a free radical initiator, such as a peroxidic compound, with a high molecular weight polymer brings about a controlled polymer chain scission whereby the polymer molecular weight and melt viscosity are reduced. Such a reaction can be conveniently carried out in a conventional screw-type extruder apparatus.

While the above-described process successfully improves the properties of high molecular weight hydrocarbon polymers such as high molecular weight stereoregular polypropylene, it has been found that when fibers are produced from the treated polymer, such as in a melt spinning method, the fibers lack luster. Thus, there is a need for an improved process for reducing the melt viscosity of high molecular weight hydrocarbon polymers which at the same time increases the luster of fibers produced from the polymers.

SUMMARY OF THE INVENTION

The present invention provides a process which meets the above-described need, i.e., a process for improving the processibility of high molecular weight hydrocarbon polymers while retaining characteristics which provide luster to fibers produced therefrom. In accordance with the invention, a high molecular weight polymer is heated to a temperature above its melting point and then reacted with both a free radical initiator which lowers the molecular weight and melt viscosity of the polymer by chain scission and a cross-linking agent which crosslinks shortened polymer chains and provides high luster to fibers produced from the polymer. Various free radical initiators including peroxidic compounds can be employed, and preferred crosslinking agents for use in accordance with the invention are polysulfonazide compounds.

The process of the invention is preferably carried out in a screw extruder apparatus wherein the polymer is melted and reacted with the free radical initiator and crosslinking agent. The extruded product has improved properties for subsequent processing including a lower viscosity when melted and fibers produced from the polymer have greater luster than those produced from a polymer treated only with a free radical initiator.

It is, therefore, a general object of the present invention to provide a process for improving the melt viscosity properties of high molecular weight hydrocarbon polymers while retaining high luster in fibers produced therefrom.

Other and further objects, features and advantages of the present invention will be readily apparent to those skilled in the art upon a reading of the description of preferred embodiments which follows.

DESCRIPTION OF PREFERRED EMBODIMENTS

High molecular weight hydrocarbon polymers which are thermoplastic, i.e., capable of being extruded, injection molded, or processed by other methods requiring melt flow, are generally prepared by the polymerization of terminally unsaturated hydrocarbons using coordination catalysts.

Coordination catalysts which yield stereoregular polymers by way of the polymerization of monosubstituted ethylenes usually bring about the formation of polymers of high molecular weight. As a result, when such polymers are melted, the melts exhibit high viscosities which are detrimental to subsequent processing because of the difficulty in transporting the melts through processing equipment. Examples of such high molecular weight stereoregular hydrocarbon polymers are those prepared from monosubstituted ethylene containing from about 3 to about 10 carbon atoms such as propylene, 1-butene, 1-pentene, 1-hexene, 1-heptene, 1-octene, 1-decene, 3-methyl-1-butene, 3-methyl-1-pentene, 4-methyl-1-pentene, 4-methyl-1-hexene, or mixtures thereof.

In accordance with the present invention, high molecular weight and high melt viscosity polymers are treated for improving their properties for subsequent processing, i.e., lowering the molecular weight of the polymers to a moderate molecular weight and lowering the melt viscosities of the polymers while retaining characteristics which provide luster to fibers produced therefrom. Such fiber luster producing characteristics relate to the final molecular weight or degree of crosslinking imparted to a treated polymer which is controlled in accordance with the present invention by the quantity of crosslinking agent reacted with the polymer. That is, a high molecular weight hydrocarbon polymer is reacted with a free radical initiator for lowering the molecular weight and the melt viscosity of the polymer by polymer chain scission, and at the same time, the polymer is reacted with a crosslinking agent whereby shortened polymer chains are crosslinked.

A variety of free radical initiators can be utilized which generate free radicals at the temperature of the polymer melt, generally within the range of from about 190° C. to about 275° C. Peroxidic compounds are particularly suitable as free radical inititators, and those having a half life of about one minute at the melt temperature are particularly suitable. Examples of such peroxidic compounds are $\alpha, \alpha'$-azobis($\alpha$-cyclopropylpropionitrile) di-t-amyl peroxide, di-$\alpha$-cumyl peroxide in dodecane, and 2,5-dimethyl-2,5-bis(t-butylperoxy) hexane. Of these, 2,5-dimethyl-2,5-bis(t-butylperoxy) hexane is preferred.

Preferred crosslinking agents for use in accordance with the present invention are polysulfonazides. The term "polysulfonazide" is used herein to mean a compound having the general formula $R(SO_2N_3)_n$ wherein R is an organic radical which is inert to crosslinking reactions, and n is an integer in the range of from about 2 to about 8. Preferably, R is selected from the group of organic radicals consisting of alkylene, halogenated alkylene, arylene, aralkylene and alkarylene radicals. Examples of such polysulfonazides are 1,5-pentane bis(sulfonazide), 1,8-octane bis(sulfonazide), 1,10-decane bis(sulfonazide), 1,3-benzene bis(sulfonazide), 4,4'-diphenyl methane bis(sulfonazide), 1-octyl-2,4,6-benzene tris(sulfonazide), 4,4'diphenyl ether bis(sulfonazide), 1,6-bis(4'-sulfonazidophenyl) hexane, etc. Of these, 1,3-benzene bis(sulfonazide) is preferred.

In carrying out the process of the present invention, the polymer to be treated is heated to a temperature whereby the polymer is melted, e.g., a temperature in the range of from about 190° C. to about 275° C. The polymer is then reacted with a free radical initiator and a crosslinking agent of the types described above. The free radical initiator, preferably a peroxidic compound, is combined with the melted polymer in an amount in the range of from about 0.03% to about 2.0% by weight of the polymer. Either simultaneously with or subsequent to combining the free radical initiator with the polymer, the polysulfonazide crosslinking agent is combined with the polymer in an amount of from about 0.1% to about 2% by weight of the polymer. The reactions of the polymer with the free radical initiator and with the crosslinking agent are allowed to proceed while the polymer remains melted so that polymer chain scission takes place and the resulting shortened chains are crosslinked. Once the polymer chain scission and crosslinking reactions have gone to completion, the resulting treated polymer having a lower melt viscosity and the characteristics required to produce fibers having high luster is passed to a fiber forming process or cooled and stored, etc.

A particularly preferred technique for carrying out the process of the present invention is to charge the polymer to be treated to a screw extruder apparatus wherein the mixing section is held at a temperature above the melting point of the polymer. The free radical initiator and crosslinking agent can be injected into the mixing section or they can be blended with the polymer in a separate mixing step prior to being introduced into the mixing section of the screw extruder. While passing through the extruder, the melted polymer is intimately mixed with the free radical initiator and crosslinking agent, and the controlled chain scission and crosslinking reactions are carried out therein. The treated product polymer can be passed through a die as a strand which can be pelletized or cooled and cut into other convenient shapes for subsequent processing. Alternatively, the treated polymer can be passed from the extruder and converted directly into fibers by a melt spinning process or other means.

In a preferred process of the present invention for treating high molecular weight polypropylene, the polypropylene is heated in a screw extruder to a temperature of about 190° C., and about 0.07% by weight of the polymer of 2,5-dimethyl-2,5-bis(t-butylperoxy) hexane free radical initiator is mixed therewith. Simultaneously, about 0.13% by weight of the polymer of 1,3-benzene bis(sulfonazide) crosslinking agent is mixed with the polymer, and the resultant mixture is reacted while passing through the extruder. The process results in the polymer having a moderate molecular weight and lower melt viscosity while retaining characteristics which provide luster to fibers produced therefrom.

In order to illustrate the process of the present invention further, the following example is given.

EXAMPLE

Samples of a homopolymer stereoregular polypropylene polymer manufactured by the Phillips 66 Company of Pasadena, Texas under the trade designation GP173 were blended with various quantities of free radical initiator and crosslinking agent, and the resultant mixtures were each passed through a screw extruder. Fibers were formed from the treated polymers in a melt spinning process, and the fibers were visually observed for luster.

The free radical initiator utilized in the tests was 2,5-dimethyl-2,5-bis(t-butylperoxy) hexane marketed under the trade name Lupersol 101 by the Lucidol Division of Pennwalt Company of Buffalo, N.Y. The crosslinking agent utilized was 1,3-benzene bis(sulfonazide).

The screw extruder apparatus used in some of the tests was a two-piece finishing line made up of a Farrell No. 2 continuous mixer and 3½-inch diameter single screw extruder (L/D 12:1) with a strand pelletizing die (designated 2CM/3.5 HME). In other of the tests a 2½-inch diameter (L/D 28:1) single screw extruder with a two-stage screw and strand pelletizing die (designated 2½" Prodex) was used.

The melt flow rate of each treated polymer sample was determined in accordance with the standard ASTM melt index test D1238 (Test Condition L) at the standard temperature for polypropylene (230° C). The results of the tests and observations are given in Table I below.

TABLE I

| Polypropylene Sample Tested | Quantity of Free Radical Initiator[1], % by Weight of Polymer | Quantity of Crosslinking Agent[2], % by Weight of Polymer | Melt Flow Rate, Grams/ 10 Minutes | Type of Equipment Used | Observed Luster Rank[3] |
|---|---|---|---|---|---|
| 1 | 0 | 0 | 3.5 (typical) | 9 FCM/ 12 HME | Satisfactory Fiber Not Produceable |
| 2 | 0.075 | 0 | 29.5 | 2 FCM/ 3.5 HME | 4 |
| 3 | 0.07 | 0.13 | 30.6 | 2 FCM 3.5 HME | 1 |
| 4 | 0.07 | 0.13 | 34.4 | 2½ Prodex | 2 |
| 5 | 0.07 | 0.10 | 35.5 | 2½ Prodex | 3 |
| 6 | 0.07 | 0.04 | 36.0 | 2½ Prodex | 4 |

[1]2,5-dimethyl-2,5-bis(t-butylperoxy) hexane
[2]1,3-benzene bis(sulfonazide)
[3]Luster ranking 1 is considered to be good luster with ranking 2 being acceptable. 3 and below are unacceptable From Table I it can be seen that the process of the present invention improves the melt properties of the polypropylene polymer tested and provides good luster to fibers formed therefrom.

The present invention, therefore, is well adapted to carry out the objects and attain the ends and advantages mentioned as well as those inherent therein. While numerours changes in the arrangements of process steps and apparatus for carrying out the process can be made, such changes are included within the scope of this invention as defined by the appended claims.

What is claimed is:

1. A process for improving the subsequent processing properties of a high molecular weight hydrocarbon polymer while retaining characteristics which provide luster to fibers produced therefrom comprising:

heating said polymer to a temperature above the melting point thereof; and reacting both a free radical initiator which generates free radicals at said temperature for lowering the melt viscosity of said polymer by polymer chain scission and a polysulfonazide cross-linking agent for crosslinking shortened polymer chains with said polymer.

2. The process of claim 1 wherein said free radical initiator is a peroxidic compound.

3. The process of claim 2 wherein said free radical initiator is 2,5-dimethyl-2,5-bis(t-butylperoxy) hexane.

4. The process of claim 1 wherein said cross-linking agent is a polysulfonazide having the general formula $R(SO_2N_3)_n$ wherein R is an organic radical selected from the group consisting of alkylene, halogenated alkylene, arylene, aralkylene and alkarylene radicals, and n is an integer in the range of from about 2 to about 8.

5. The process of claim 4 wherein said crosslinking agent is 1,3-benzene bis(sulfonazide).

6. The process of claim 2 wherein said free radical initiator is reacted with said polymer in an amount in the range of from about 0.03% to about 2.0% by weight of said polymer.

7. The process of claim 4 wherein said crosslinking agent is reacted with said polymer in an amount in a range of from about 1.0% to about 0.2% by weight of said polymer.

8. A process for improving the subsequent processing properties of a high molecular weight hydrocarbon polymer while retaining characteristics which provide luster to fibers produced therefrom comprising:

heating said polymer to a temperature in the range of from about the melting point thereof to about 275° C.;

combining both a free radical initiator which generates free radicals in said temperature range for lowering the melt viscosity of said polymer by polymer chain scission and a polysulfonazide cross-linking agent for crosslinking shortened polymer chains with said polymer, said free radical initiator being combined with said polymer in an amount in the range of from about 0.3% to about 2.0% by weight of said polymer and said cross-linking agent being combined with said polymer in an amount in the range of from about 0.1% to about 0.2% by weight of said polymer; and passing the resulting mixture through a screw extruder.

9. The process of claim 8 wherein said free radical initiator is a peroxidic compound.

10. The process of claim 9 wherein said free radical initiator is 2,5-dimethyl-2,5-bis(t-butylperoxy) hexane.

11. The process of claim 10 wherein said crosslinking agent is a polysulfonazide having the general formula $R(SO_2N_3)_n$ wherein R is an organic radical selected from the group consisting of alkylene, halogenated alkylene, arylene, aralkylene and alkarylene radicals and n is an integer in the range of from about 2 to about 8.

12. The process of claim 11 wherein said crosslinking agent is 1,3-benzene bis(sulfonazide).

13. The process of claim 8 wherein said high molecular weight hydrocarbon polymer is polypropylene.

14. The process of claim 13 wherein said polymer is heated to a temperature of about 190° C.

15. The process of claim 14 wherein said free radical initiator is 2,5-dimethyl-2,5-bis(t-butylperoxy) hexane.

16. The process of claim 15 wherein said free radical initiator is combined with said polymer in an amount of about 0.07% by weight of said polymer.

17. The process of claim 16 wherein said crosslinking agent is 1,3-benzene bis(sulfonazide).

18. The process of claim 17 wherein said crosslinking agent is combined with said polymer in an amount of about 0.13% by weight of said polymer.

* * * * *

UNITED STATES PATENT AND TRADEMARK OFFICE
CERTIFICATE OF CORRECTION

PATENT NO. : 5,037,895
DATED : August 6, 1991
INVENTOR(S) : Ted W. Marker and J. S. Gwinn It is certified that error appears in the above-identified patent and that said Letters Patent is hereby corrected as shown below:

Column 5, line 30, change "1.0%" to --0.1%--.

Signed and Sealed this

Twenty-second Day of December, 1992

Attest:

DOUGLAS B. COMER

*Attesting Officer*      *Acting Commissioner of Patents and Trademarks*